United States Patent
Karlsson et al.

(10) Patent No.: US 9,985,540 B2
(45) Date of Patent: May 29, 2018

(54) REFERENCE VOLTAGE GENERATOR FOR A SWITCHED MODE POWER SUPPLY

(71) Applicant: TELEFONAKTIEBOLAGET L M ERICSSON (PUBL), Stockholm (SE)

(72) Inventors: Magnus Karlsson, Oskarshamn (SE); Oscar Persson, Kalmar (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 263 days.

(21) Appl. No.: 14/917,144

(22) PCT Filed: Feb. 18, 2016

(86) PCT No.: PCT/EP2016/053464
§ 371 (c)(1),
(2) Date: Mar. 7, 2016

(87) PCT Pub. No.: WO2017/140368
PCT Pub. Date: Aug. 24, 2017

(65) Prior Publication Data
US 2018/0048235 A1 Feb. 15, 2018

(51) Int. Cl.
*G05F 1/00* (2006.01)
*H02J 1/00* (2006.01)
(Continued)

(52) U.S. Cl.
CPC ......... *H02M 3/3353* (2013.01); *H02M 3/156* (2013.01); *H02M 3/33507* (2013.01); *H02M 3/33561* (2013.01); *H02M 3/33569* (2013.01)

(58) Field of Classification Search
CPC ........... H02M 2001/007; H02M 3/158; H02M 3/1584; H02M 3/28; H02M 3/33507;
(Continued)

(56) References Cited

U.S. PATENT DOCUMENTS 8,300,432 B2 10/2012 Appelberg
9,621,050 B2 * 4/2017 Ryan ................ H02M 3/33507
(Continued)

FOREIGN PATENT DOCUMENTS

JP 2001209878 A 8/2001
WO 2015137852 A1 9/2015
(Continued)

*Primary Examiner* — Alex Torres-Rivera (57) ABSTRACT

An isolated fly-buck converter is provided for converting an input voltage to an output voltage, and for generating a voltage indicative of the input voltage. The isolated fly-buck converter comprises on its secondary side an input voltage sensing circuit for generating the voltage indicative of the input voltage, the input voltage sensing circuit comprising a capacitive element and a rectifying element connected in series. The input voltage sensing circuit is connected across a secondary winding of the isolated fly-buck converter such that the rectifying element prevents current from flowing through the input voltage sensing circuit during the fly-buck phase of operation of the converter. The input voltage sensing circuit also has a voltage buffer arranged to buffer a voltage which is indicative of a sum of the output voltage of the converter and the voltage over the capacitive element, and output the buffered voltage or a voltage based on the buffered voltage as the voltage that is indicative of the input voltage. The output of the voltage buffer is connected to ground via a first resistive element in series with a parallel combination of a second resistive element and a third capacitive element.

15 Claims, 8 Drawing Sheets (51) Int. Cl.
*H02M 3/335* (2006.01)
*H02M 3/156* (2006.01)

(58) Field of Classification Search
CPC ......... H02M 3/33523; H02M 3/33569; H02M 3/33561; H02M 3/156
USPC ..................... 323/268, 272; 363/15, 21.12
See application file for complete search history.

(56) References Cited

U.S. PATENT DOCUMENTS

| | | | |
|---|---|---|---|
| 2011/0090724 A1* | 4/2011 | Appelberg | H02M 3/33592 363/89 |
| 2012/0275196 A1* | 11/2012 | Chapman | H02J 3/383 363/17 |
| 2016/0329815 A1* | 11/2016 | Massolini | H02M 3/33507 |
| 2017/0194868 A1* | 7/2017 | Choudhary | H02M 3/33507 |

FOREIGN PATENT DOCUMENTS

| | | | |
|---|---|---|---|
| WO | 2015174899 A1 | 11/2015 | |
| WO | 2017007387 A1 | 1/2017 | |

* cited by examiner

REFERENCE VOLTAGE GENERATOR FOR A SWITCHED MODE POWER SUPPLY

This application is a 371 of International Application No. PCT/EP2016/053464, filed Feb. 18, 2016, the disclosure of which is fully incorporated herein by reference.

TECHNICAL FIELD

The present invention generally relates to the field of switched mode power supplies (sometimes referred to as switch mode power supplies or switching mode power supplies) and more specifically to the generation of a reference voltage by a fly-buck converter for use in control of a switched mode power supply.

BACKGROUND

The switched mode power supply (SMPS) is a well-known type of power converter having a diverse range of applications by virtue of its small size and weight and high efficiency, for example in personal computers and portable electronic devices such as cell phones. A SMPS achieves these advantages by switching one or more switching elements such as power MOSFETs at a high frequency (usually tens to hundreds of kHz), with the frequency or duty cycle of the switching being adjusted by a feedback loop (also widely referred to as a "compensation loop" or "feedback circuit") to convert an input voltage to a desired output voltage. An SMPS may take the form of a rectifier (AC/DC converter), a DC/DC converter, a frequency changer (AC/AC) or an inverter (DC/AC).

Increasing dynamic requirements, such as monotonic start-up, recovery after short-circuit, load transient performance, have led to the relocation of the control circuits of many modern isolated switched mode power supplies from the primary side to the secondary side of the SMPS. When the control circuit is on the secondary side of the isolation barrier, some means of powering it from the primary side needs to be provided, and the input voltage needs to be monitored accurately, since it is used in the control of the main converter of the SMPS.

The control circuit of an isolated SMPS is often powered via an auxiliary (or 'housekeeping') converter. There are numerous of ways of designing such an auxiliary converter.

Figure 1:
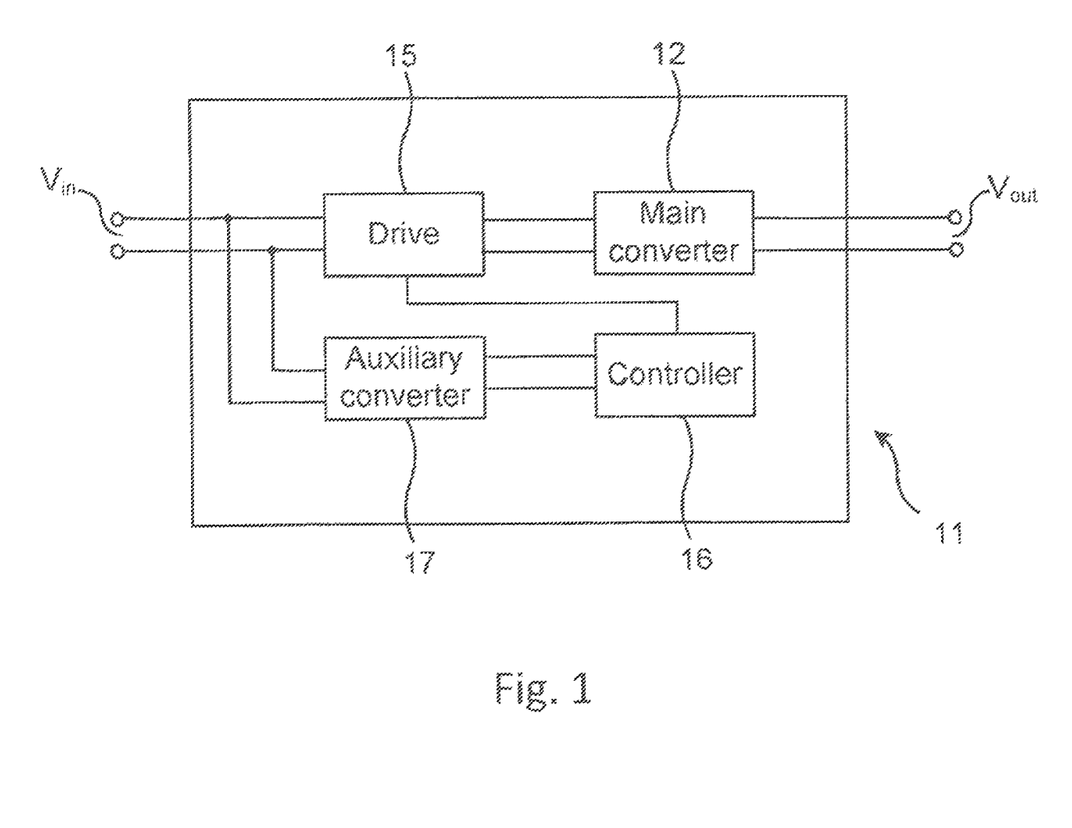
FIG. 1 illustrates functional components of a conventional switched mode power supply.

For example, FIG. 1 provides a schematic illustration of an SMPS 11 comprising a main converter 12 for converting an input voltage $V_{in}$ to an output voltage $V_{out}$, a drive circuit 15 for driving the converter 12, a controller 16 for controlling the drive circuit 15 (for example, by controlling the switching duty cycle or the switching frequency of one or more switching elements, such as field-effect transistors (FETs), in the drive circuit 15) and thus the operation of the main converter 12, and an auxiliary converter 17 for down-converting the input voltage $V_{in}$ to a voltage suitable for powering the controller 16. Such an auxiliary converter 17 may supply power to the primary side circuits of the SMPS 11 and provide an isolated power supply to secondary side circuits of the SMPS 11. The auxiliary converter 17 may also send information about the input voltage $V_{in}$ to secondary side circuits, such as controller 16, which information may be used for voltage feed-forward in an SMPS controlled from the secondary side, or for setting a reference voltage in a switched mode power supply being controlled in the regulated ratio (RR) mode or the hybrid regulated ratio (HRR) mode, as described in WO 2012/116750 A1 and WO 2013/113354 A1, for example.

The main converter 12 is an isolated DC-DC converter, typically down-converting the input voltage $V_{in}$ to a suitable output voltage $V_{out}$ for powering the load of the SMPS 11. The main converter 12 may typically operate with an input or output voltage range of 10-100 V.

Figure 2:
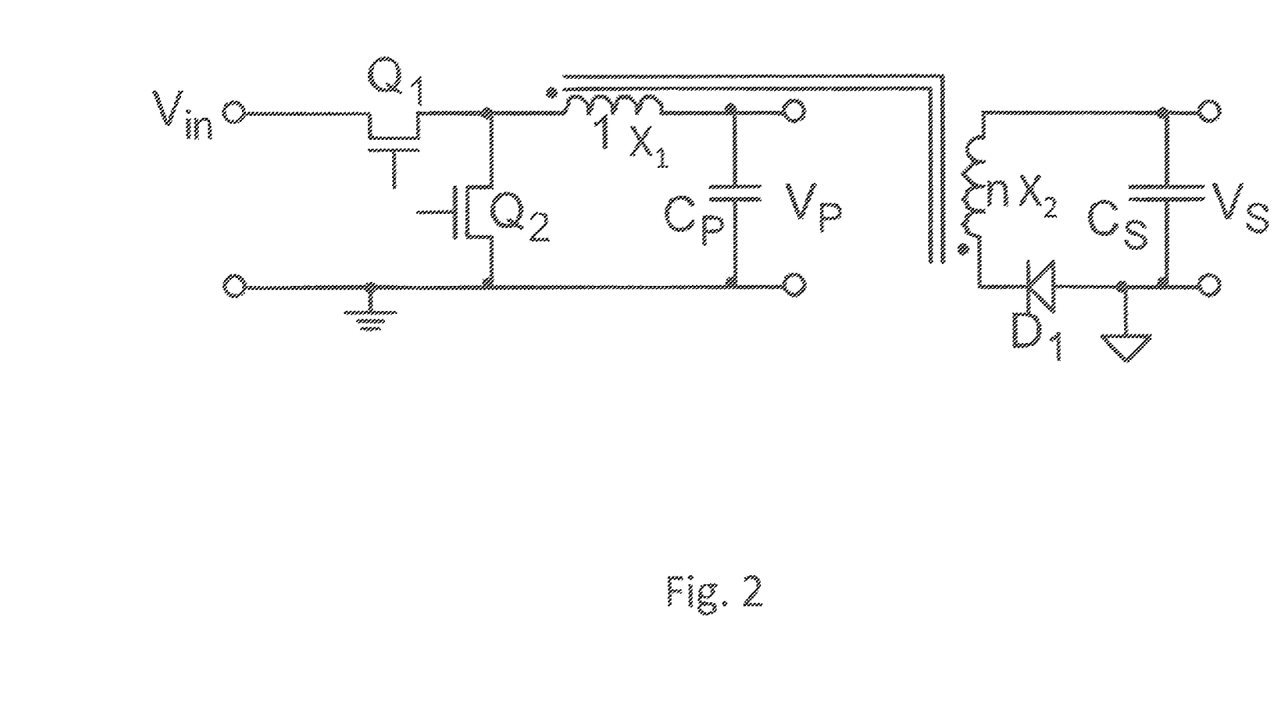
FIG. 2 illustrates a conventional isolated fly-buck converter.

The auxiliary converter 17 may be provided in the form of a fly-buck converter. FIG. 2 illustrates an isolated fly-buck converter, which can be used as the auxiliary converter 17 in the SMPS of FIG. 1.

The fly-buck converter is configured to convert the input voltage $V_{in}$ to a secondary side output voltage $V_S$, and comprises a primary winding $X_1$, a non-isolated buck $C_P$, and a pair of switches $Q_1$, $Q_2$ on a primary side of the converter. A secondary winding $X_2$, a first capacitive element $C_S$, and a first rectifying element $D_1$ are provided on the secondary side of the converter. While isolated fly-buck converters typically have a transformer ratio between the first and secondary windings of 1:1, field-effect transistors, which may be used in controller 16, usually require lower voltages. Therefore, a suitable converter ratio for the isolated fly-back converter may be 1:0.75.

The non-isolated buck $C_P$ (which may be provided in the form of a capacitor, for example) is connected in series with the primary winding $X_1$ and the pair of switching elements $Q_1$, $Q_2$ (e.g. FETs such as MOSFETs) arranged in the primary side circuit. The switching elements $Q_1$, $Q_2$ are configured to switch such that, during a forward phase of operation of the isolated fly-buck converter, the primary winding $X_1$ and the non-isolated buck $C_P$ are connected to the input voltage $V_{in}$ and, during a fly-buck phase of operation of the isolated fly-buck converter, the primary winding $X_1$ and the non-isolated buck $C_P$ are disconnected from the input voltage and are connected to one another in a closed circuit. The switching of the switching elements $Q_1$, $Q_2$ may be controlled by a switching controller (not illustrated).

The secondary winding $X_2$ is electromagnetically coupled to the primary winding $X_1$. The first capacitive element $C_S$, which may be provided in the form of a capacitor, is connected over the secondary winding $X_2$. The first rectifying element $D_1$, which may be provided in the form of a diode, is connected to the secondary winding $X_2$ and the first capacitive element $C_S$ so as to prevent current from flowing through the secondary winding $X_2$ to charge/discharge the first capacitive element $C_S$ during the forward phase of operation of the fly-buck converter. The output voltage $V_S$ of the fly-buck converter corresponds to the voltage over the first capacitive element $C_S$.

A modified form of the above-described fly-buck converter, which allows a reliable measurement of the input voltage to be made on the secondary side, is described in WO 2015/137852 A1. The circuit diagram of this modified fly-buck converter is illustrated in FIG. 3.

Figure 3:
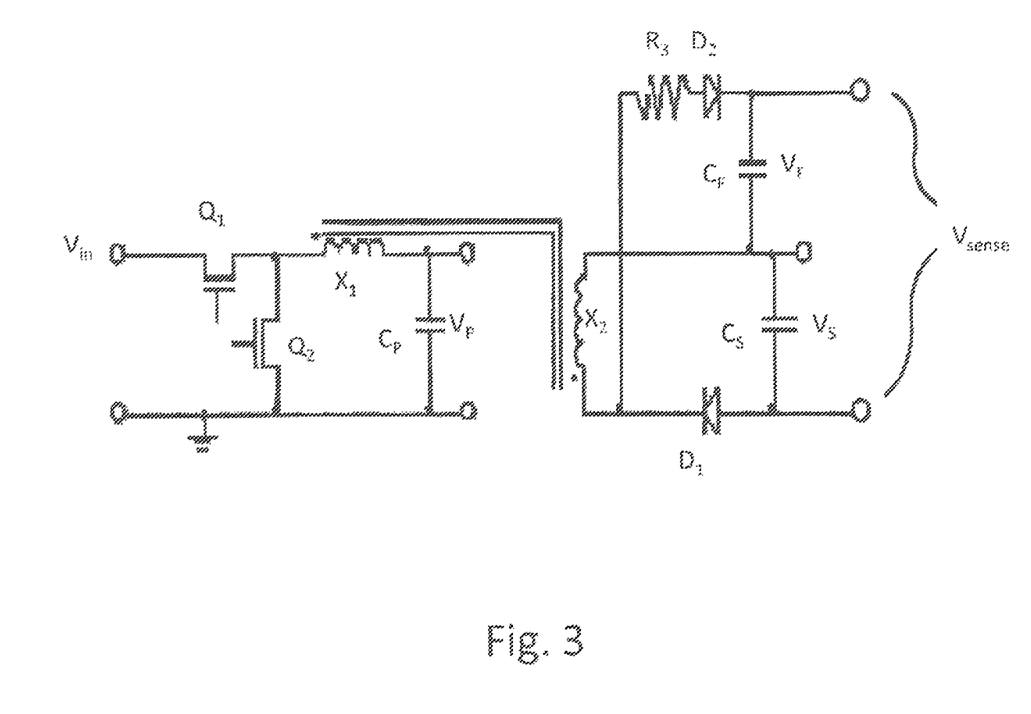
FIG. 3 illustrates a second conventional isolated fly-buck converter.

As shown in FIG. 3, the modified fly-buck converter is additionally provided with an input voltage sensing circuit for generating a voltage $V_{sense}$ that is indicative of the input voltage $V_{in}$. The input voltage sensing circuit comprises a second capacitive element $C_F$ (e.g. implemented as a capacitor) and a second rectifying element $D_2$ (e.g. implemented as a diode) that are connected in series. The input voltage sensing circuit is connected over the secondary wiring $X_2$ such that the second rectifying element $D_2$ prevents current from flowing through the input voltage sensing circuit during the fly-buck phase. The sum of the voltage $V_F$ over the second capacitive element $C_F$ and the output voltage $V_S$ is the sensed measure $V_{sense}$ on the secondary side, which is indicative of the input voltage $V_{in}$ on the primary side. The input voltage sensing circuit may, as in the example of FIG.

3, comprise a resistive element $R_3$ connected in series with the second capacitive element $C_F$ and the second rectifying element $D_2$, the resistive element $R_3$ serving to reduce current spikes during charging of the second capacitive element $C_F$, thereby producing a less noisy voltage over second capacitive element $C_F$.

To further explain the operation of the modified fly-buck converter shown in FIG. 3, the relation between the sensed voltage $V_{sense}$ and the input voltage $V_{in}$ will be derived in the case where the primary winding $X_1$ has one winding and the secondary winding $X_2$ is taken to have n windings. Steady-state switching with a duty cycle D, a small ripple current in the windings, and a small voltage ripple in the capacitances are also assumed.

Figure 4A:
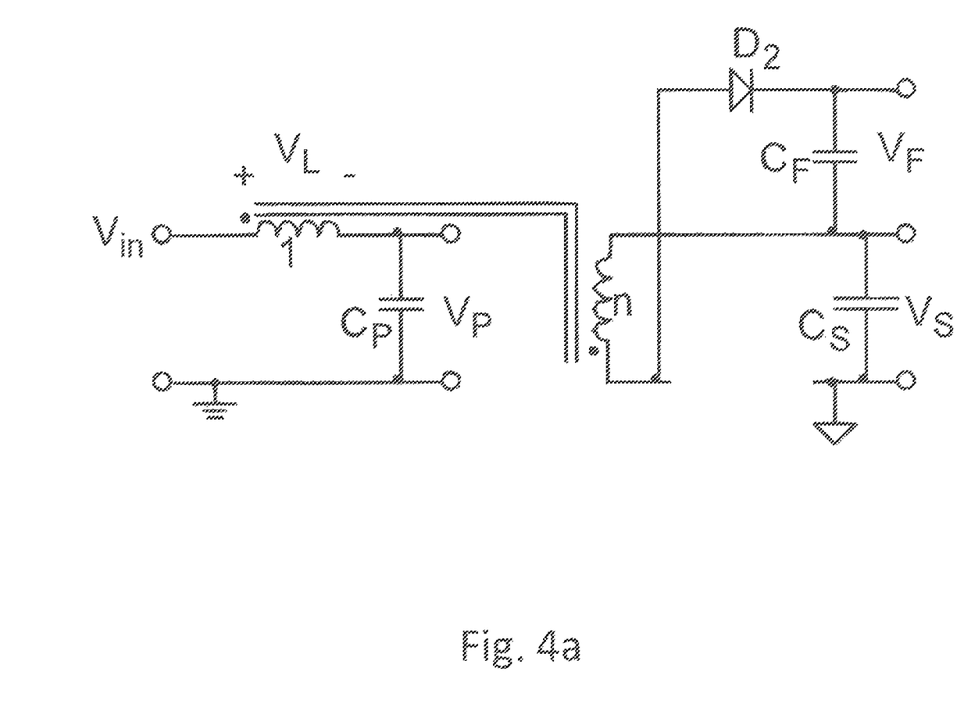
FIGS. 4*a* and 4*b* show circuit diagrams which the isolated fly-buck converter of FIG. 3 can be considered to simplify to during the forward and fly-buck phases of operation, respectively.

During the forward phase, wherein the switching element $Q_1$ is conducting and the switching element $Q_2$ is off, the fly-buck converter of FIG. 3 can be simplified to the circuit diagram shown in FIG. 4a, since the rectifying element $D_1$ becomes non-conducting. For simplicity, the resistive element $R_3$ is removed during this analysis.

The voltage over the inductor can be stated directly on the primary side as $$V_L = V_{in} - V_P,\qquad\text{Equation 1}$$

or, using the reflected voltage over the second capacitive element $V_F$ on the primary side, as $$V_L = \frac{V_F + V_D}{n},\qquad\text{Equation 2}$$

where $V_D$ is the voltage drop over the diode $D_2$ in the forward direction.

Figure 4B:
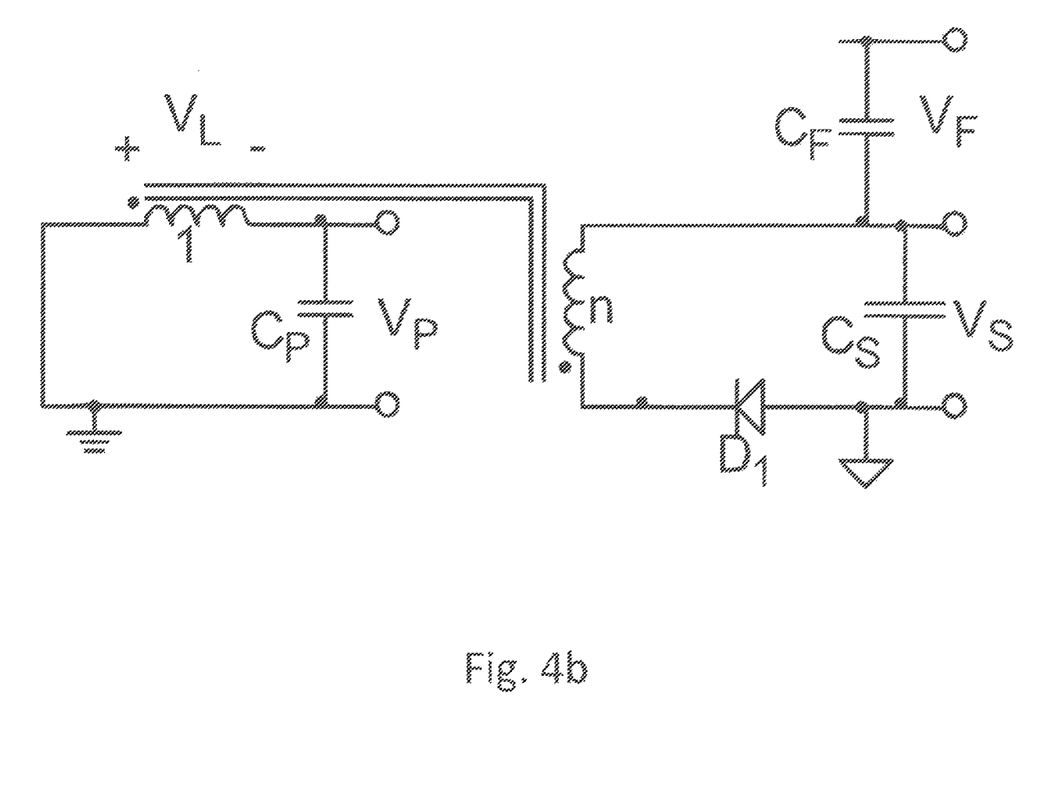

During the fly-buck phase, the fly-buck converter of FIG. 3 can be simplified to the circuit diagram shown in FIG. 4b.

The voltage over the primary winding $X_1$ can be stated directly on the primary side as $$V_L = -V_P,\qquad\text{Equation 3}$$

or, using the reflected output voltage $V_S$ on the primary side, as $$V_L = -\frac{V_S + V_D}{n},\qquad\text{Equation 4}$$

where $V_D$ is the voltage drop over the diode $D_1$ in the forward direction.

For the non-isolated buck voltage $V_P$, the volt-second balance using Equations 1 and 3 becomes $$D(V_{in}-V_P)+D'(-V_P)=0,\qquad\text{Equation 5}$$

where the forward phase duration is equal to the duty cycle D, and the fly-buck duration is $(1-D)=D'$. Solving Equation 5 for $V_P$ yields $$V_P = DV_{in}.\qquad\text{Equation 6}$$

For the isolated fly-buck, the volt-second balance using Equations 1 and 4 becomes $$D(V_{in}-V_P)+D'\left(-\frac{V_S+V_D}{n}\right)=0.\qquad\text{Equation 7}$$

Collecting terms on each side yields $$DV_{in} = DV_P + D'\frac{V_S + V_D}{n},$$

and using Equation 6 yields $$V_P = DV_P + D'\frac{V_S + V_D}{n}.$$

Collecting $V_P$ on the left-hand side and using $(1-D)=D'$ yields $$D'V_P = D'\frac{V_S + V_D}{n}.$$

Dividing this by D' on both sides and solving for $V_S$ yields $$V_S = nV_P - V_D.\qquad\text{Equation 8}$$

For the isolated forward-buck, the volt-second balance using Equations 2 and 3 becomes $$D\frac{V_F + V_D}{n} + D'(-V_P) = 0.\qquad\text{Equation 9}$$

Solving Equation 1 for $D'(-V_P)$ and replacing in Equation 9 yields $$D\frac{V_F + V_D}{n} + D(V_{in} - V_P) = 0.$$

Solving for $V_F$ yields $$V_F = n(V_{in} - V_P) - V_D.\qquad\text{Equation 10}$$

The sensed voltage $V_{sense}$ indicative of the input voltage $V_{in}$ is the sum of the voltages $V_S$ and $V_F$, and using Equations 8 and 10 yields $$V_{sense} = V_S + V_F = nV_P - V_D + n(V_{in} - V_P) - V_D,$$

and collecting terms yields $$V_{sense} = nV_{in} - 2V_D.\qquad\text{Equation 11}$$

Hence, the sensed voltage $V_{sense}$ is linear in the input voltage $V_{in}$ and offset by two diode forward voltages $V_D$. Since the input voltage $V_{in}$ times the ratio n is much greater than $2V_D$, Equation 11 can be simplified to $$V_{sense} \approx nV_{in}.\qquad\text{Equation 12}$$

The diode voltage drops can be reduced using Schottky diodes or can even be eliminated by using synchronous rectification.

The sensed voltage $V_{sense}$ indicative of the input voltage $V_{in}$ and sensed on the isolated secondary side can be used in the control of the main converter 12 of the switched mode power supply 11.

The controller 16 of the switched mode power supply 11 may thus be configured to receive the sensed voltage $V_{sense}$ or a voltage indicative thereof, from the isolated secondary side of the auxiliary converter 11, i.e. the above-described fly-buck converter, and to control the drive circuit 15 and thus the voltage conversion performed by the main converter 12 on the basis of the sensed voltage $V_{sense}$.

The sensed voltage $V_{sense}$ as measured on the secondary side, may then be used for voltage feedforward control in a secondary-side controlled switched mode power supply. Alternatively or additionally, the sensed voltage $V_{sense}$ may be used for setting the reference voltage in a regulated ratio or hybrid regulated ratio controlled switched mode power supply.

Figure 5:
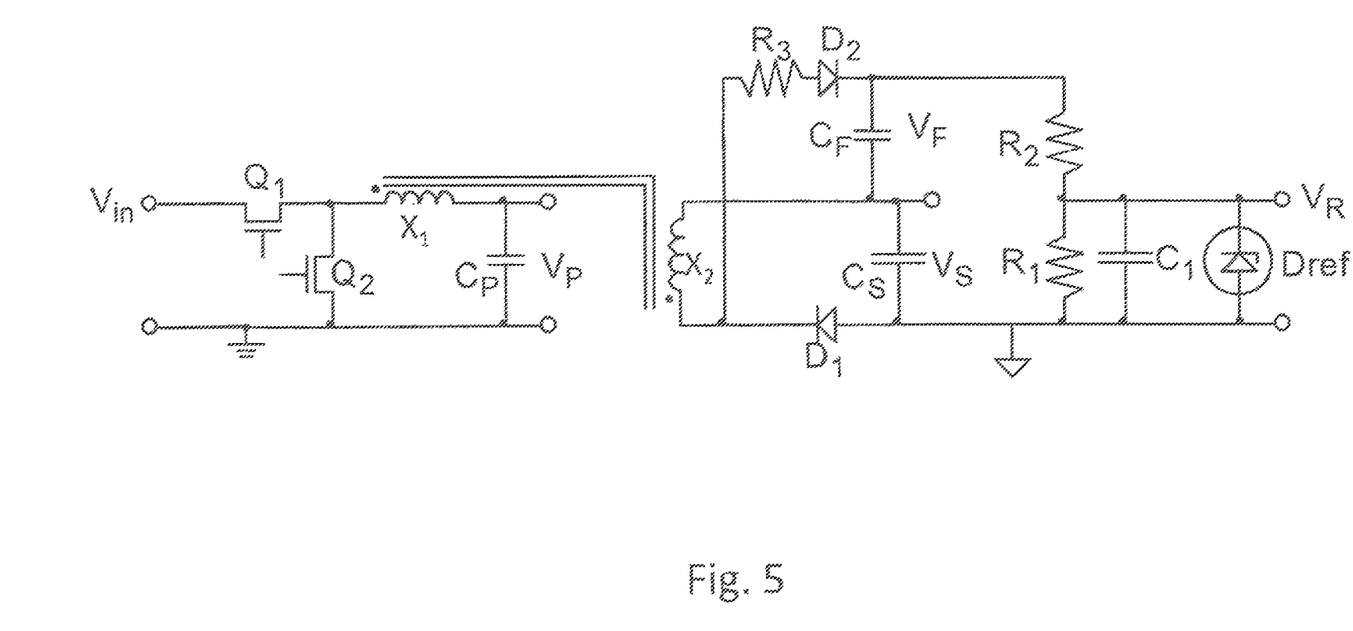
FIG. 5 illustrates a fly-buck converter based on the converter shown in FIG. 3, which may be used for hybrid regulated ratio control in the switched mode power supply of FIG. 1.

FIG. 5 illustrates another isolated fly-buck converter disclosed in WO 2015/137852, which is an extension of the converter of FIG. 3 and may be used for hybrid regulated ratio (HRR) control in the switched mode power supply of FIG. 1.

The isolated fly-buck converter of FIG. 5 comprises, on the secondary side, a voltage divider including two serially-connected resistive elements, $R_1$ and $R_2$, that are connected in parallel over the first and second capacitive elements $C_S$ and $C_F$ to divide the sensed voltage $V_{sense}$. A fourth capacitive element, $C_1$ (which may be provided in the form of a capacitor), and a voltage reference (voltage-limiting element) $V_{ref}$ are connected in parallel over one of the resistive elements of the voltage divider (namely, $R_1$), wherein a voltage $V_R$ over the voltage reference $V_{ref}$ changes with a time constant that is dependent upon the fourth capacitive element $C_1$. The voltage $V_R$ is usable as a hybrid regulated ratio reference in hybrid regulated ratio (HRR) control of the main converter 12.

In the fly-buck converter of FIG. 5, the voltage $V_{sense} \approx n \cdot V_{in}$ is divided using the potential divider comprising $R_1$ and $R_2$, and a time constant is set by the capacitor $C_1$. The reference voltage is saturated using a high precision voltage reference $V_{ref}$, yielding the voltage for hybrid regulated ratio as $$V_R = \min\left(\frac{R_1}{R_1 + R_2} \cdot \frac{1}{1 + sC_1 \frac{R_1 R_2}{R_1 + R_2}} n V_{in}, V_{ref}\right) \quad \text{Equation 13}$$

where s is a complex frequency, the regulated ratio input voltage part has the gain $G_{RR}$ of $$G_{RR} = n \frac{R_1}{R_1 + R_2} \quad \text{Equation 14}$$

and the time constant $\tau_{RR}$ becomes $$\tau_{RR} = C_1 \frac{R_1 R_2}{R_1 + R_2}. \quad \text{Equation 15}$$

SUMMARY

The present inventors have recognised that accurate sensing of, and the ability to configure increasing and decreasing slew rates of, the voltage $V_R$ is important for proper control of an SMPS.

More particularly, the inventors have recognised that, with known converter of FIG. 5, for a given capacitor $C_1$, it is not possible to configure a slew rate of reference signal $V_R$ without also having to modify the gain $G_{RR}$ for generating reference signal $V_R$. Therefore, where the required voltage range of the reference signal $V_R$ is defined by the recipient circuit of the reference signal, it is not possible to configure the slew rate of the reference signal at all. Furthermore, in the fly-buck converter of FIG. 5, the increasing and decreasing slew rates of voltage $V_R$ are both defined by the potential divider comprising $R_1$ and $R_2$, and capacitor $C_1$, and so the increasing and decreasing slew rates cannot be independently configured.

In view of the above problems, the inventors have devised an isolated fly-buck converter for converting an input voltage to an output voltage, and generating a voltage indicative of the input voltage. The isolated fly-buck converter comprises a primary side circuit comprising a primary winding and a non-isolated buck connected in series, and switching elements arranged in the primary side circuit and configured to switch such that, during a forward phase of operation of the isolated fly-buck converter, the primary winding and the non-isolated buck are connected to the input voltage and, during a fly-buck phase of operation of the isolated fly-buck converter, the primary winding and the non-isolated buck are disconnected from the input voltage and are connected to one another in a closed circuit. The isolated fly-buck converter further comprises a secondary side circuit comprising a secondary winding coupled to the primary winding, a first capacitive element connected across the secondary winding, and a first rectifying element that is connected to the secondary winding so as to prevent current flowing through the secondary winding during the forward phase, wherein the output voltage is the voltage across the first capacitive element. The secondary side circuit further comprises an input voltage sensing circuit for generating the voltage indicative of the input voltage, the input voltage sensing circuit comprising a second capacitive element and a second rectifying element connected in series, the input voltage sensing circuit being connected across the secondary winding such that the second rectifying element prevents current from flowing through the input voltage sensing circuit during the fly-buck phase. The input voltage sensing circuit further comprises a voltage buffer arranged to buffer a voltage, which is indicative of a sum of the voltage over the second capacitive element and the output voltage, and to output the buffered voltage or a voltage based on the buffered voltage as the voltage that is indicative of the input voltage, wherein the output of the voltage buffer is connected to ground via a first resistive element in series with a parallel combination of a second resistive element and a third capacitive element.

The inventors have further devised a switched mode power supply comprising an isolated fly-buck controller as set out above.

The inventors have yet further devised a base station comprising an isolated fly-buck controller or a switched mode power supply as set out above.

BRIEF DESCRIPTION OF THE DRAWINGS

Embodiments of the invention will now be explained in detail, by way of example only, with reference to the accompanying figures, in which.

DETAILED DESCRIPTION OF EMBODIMENTS

Figure 6:
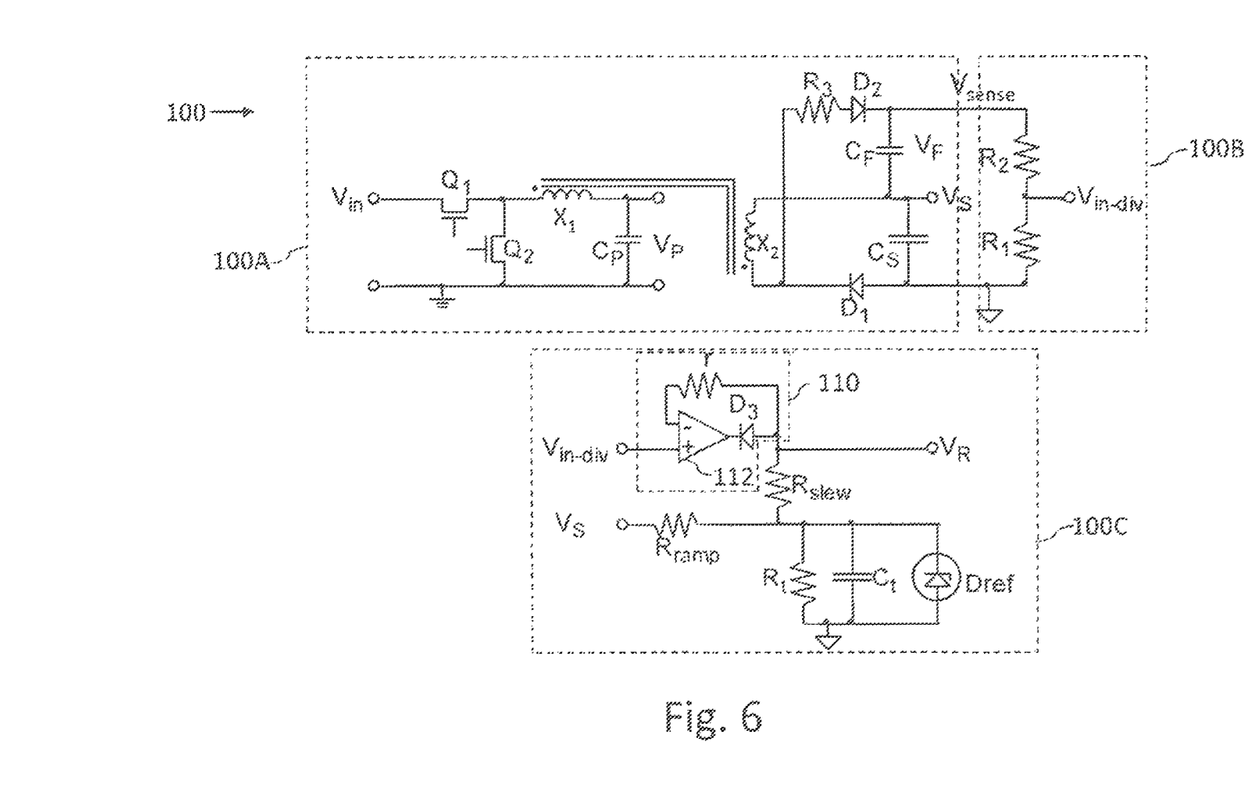
FIG. 6 shows a circuit diagram of an isolated fly-buck converter according to an embodiment of the present invention.

FIG. 6 shows the circuit diagram of an isolated fly-buck converter 100 according to an embodiment of the present invention, which is configured to convert an input voltage $V_{in}$ to an output voltage $V_S$ on the secondary side, and generate a voltage $V_R$ that is indicative of the input voltage $V_{in}$.

The isolated fly-buck converter 100 may form part of a switched mode power supply as shown in FIG. 1, which also includes a main converter 12 (e.g. a DC-DC converter) configured to convert the input voltage $V_{in}$ to an output voltage $V_{out}$ of the switched mode power supply 11 by switching one or more switching elements (e.g. FETs such as MOSFETs), and a controller 16 arranged to control the operation of the main converter 12, including the conversion performed by the main converter 12, by controlling the switching of the switching element(s) on the basis of a control signal. In this embodiment, the isolated fly-buck converter 100 functions as the auxiliary converter 17 for powering the controller 16 using output voltage $V_S$. The isolated fly-buck converter 100 is preferably configured to also provide the controller 16 with the control signal, this being the reference voltage $V_R$ that the isolated fly-buck converter 100 generates. Alternatively, in other embodiments, the voltage $V_R$ generated by the isolated fly-buck converter 100 may be provided to a sample and hold circuit that extracts data representative of the input voltage signal $V_{in}$, which may then be used for control of the operation of the main converter 12 by the controller 16, or for other purposes. The reference voltage $V_R$ is indicative of the input voltage $V_{in}$, as will be explained in the following.

Referring again to FIG. 6, the isolated fly-buck converter 100 may, for illustrative purposes only, be considered to be formed of three parts, i.e. 100A, 100B and 100C.

Part 100A of the fly-buck converter 100 is the same as the fly-buck converter described above with reference to FIG. 3, and the layout and functionality of its circuit will therefore not be described again here.

Part 100C of the isolated fly-buck converter 100 comprises a voltage buffer 110, which is arranged to buffer a voltage $V_{in-div}$ that is indicative of the sensed voltage $V_{sense}$ (this being a sum of the voltage $V_F$ over the second capacitive element $C_F$ and the output voltage $V_S$), and to output the buffered voltage as the voltage $V_R$ that is indicative of the input voltage $V_{in}$.

The voltage buffer 110 may, as in the present embodiment, comprise an operational amplifier 112 provided with a feedback circuit that is arranged to feed back an output voltage of the voltage buffer 110 to an inverting input of the operational amplifier 112. The non-inverting input of the operational amplifier is arranged to receive a fraction of the voltage $V_{sense}$ that is set by the values of resistors $R_1$ and $R_2$ forming a potential divider in part 100B of the converter 100. A third resistive element r may, as in the present embodiment, be provided in the feedback circuit of the operational amplifier 112, between the output of the voltage buffer 110 and the inverting input of the operational amplifier 112. The resistor r serves to prevent, or at least mitigate, any voltage offset problems which may arise.

The output of the voltage buffer 110 is connected to ground via a first resistive element $R_{slew}$ in series with a parallel combination of a second resistive element $R_t$ and a third capacitive element $C_t$. The rate of charging and discharging of capacitive element $C_t$ through the first and second resistive elements $R_{slew}$ and $R_t$ defines slew rates for the voltage $V_R$. When the fly-buck converter is inactive, the second resistive element $R_t$ provides a discharge path for the third capacitive element $C_t$.

The voltage buffer 110 may, as in the present embodiment, further comprise a third rectifying element $D_3$ arranged to connect the output of the operational amplifier 112 to the first resistive element $R_{slew}$ so as to prevent current from flowing from the voltage buffer 110 to the first resistive element $R_{slew}$. In this embodiment, third rectifying element $D_3$ is arranged between the output of the operational amplifier 112 and a terminal for reading the voltage $V_R$, as shown in FIG. 6. Accordingly, when the third rectifying element $D_3$ is biased to prevent current from flowing through $R_{slew}$, the voltage $V_R$ does not depend on $V_{sense}$, and only depends on the voltage across the third capacitive element $C_t$.

As the third rectifying element $D_3$ is arranged as part of the feedback circuit of the voltage buffer 110 in this embodiment, then when the third rectifying element $D_3$ is reverse biased to prevent current flow, there is no feedback in the buffer, and the non-conducting state is maintained until voltage $V_R$ becomes equal to or greater than the voltage $V_{in-div}$ through the charging of third capacitive element $C_t$.

With the combined effects of the voltage buffer 110 and the first and second resistive elements $R_{slew}$ and $R_t$, the voltage $V_R$ follows the buffered voltage $V_{in-div}$ with a regulated ratio response according to the following equation (neglecting the small offset over $R_{slew}$):

$$V_R = \frac{1}{1 + sC_t \frac{R_t R_{slew}}{R_t + R_{slew}}} nV_{in}, \quad \text{Equation 16}$$

where the time constant $\tau_{RR}$ is $$\tau_{RR} = C_t \frac{R_t R_{slew}}{R_t + R_{slew}}. \quad \text{Equation 17}$$

In embodiments like the present that include the third rectifying element $D_3$, the rectifier prevents the third capacitive element $C_t$ from being charged by the voltage buffer 110. Therefore, in embodiments where the third rectifying element $D_3$ is included in the input voltage sensing circuit, it may be necessary to introduce an alternative means for charging the third capacitive element $C_t$. This may be achieved by arranging the second resistive element $R_t$ and the third capacitive element $C_t$ such that they are connected to ground in parallel with the first capacitive element $C_S$. This connection may, as in the present embodiment, be achieved by the input voltage sensing circuit further comprising a fourth resistive element, $R_{ramp}$, connecting the first capacitive element $C_S$ to the first resistive element $R_{slew}$, the second resistive element $R_t$ and the third capacitive element $C_t$, as shown in FIG. 6.

When the charge in third capacitive element $C_t$, and therefore the voltage $V_R$, decrease following a decrease of the input voltage $V_{in}$, current flows through both the first resistive element $R_{slew}$ and the fourth resistive element $R_{ramp}$, and so the third capacitive element $C_t$ discharges with a time constant that is dependent on both the first and fourth resistive elements $R_{slew}$ and $R_{ramp}$. On the other hand, due to third rectifying element $D_3$, when the third capacitive element $C_t$ charges following an increase in the input voltage $V_{in}$, current flows through the fourth resistive element $R_{ramp}$ but not through the first resistive element $R_{slew}$, and so the third capacitive element $C_t$ charges with a time constant that is dependent upon the fourth resistive element $R_{ramp}$ but not dependent upon the first resistive element $R_{slew}$. Therefore, by choosing appropriate resistance values for the first and fourth resistive elements $R_{slew}$ and $R_{ramp}$, the fly-buck converter 100 may be configured such that the voltage $V_R$ responds to changes in the input voltage $V_{in}$ with different rising and falling slew rates that may be set independently of one another.

Additionally, the fourth resistive element $R_{ramp}$ may be adjusted to control an initial charging time of the third capacitive element $C_t$, which is dependent upon the ratio between the resistances of fourth resistive element $R_{ramp}$ and first resistive element $R_{slew}$. The value of $R_{ramp}$ may therefore be set to achieve a required initial ramp-up time of voltage $V_R$.

The isolated fly-buck converter 100 may, as in the present embodiment further comprise a voltage reference $D_{ref}$ connected in parallel with the second resistive element $R_t$ and the third capacitive element $C_t$. The voltage reference $D_{ref}$ functions as a voltage-limiting element and is hereafter referred to as such. The voltage-limiting element $D_{ref}$ may, for example, comprise a Zener diode. A converter with a voltage-limiting element $D_{ref}$ may, for example, be used in order to operate an SMPS comprising the isolated fly-buck converter 100 in a Hybrid Regulated Ratio (HRR) mode. The output voltage $V_{out}$ of the SMPS is provided with a regulated ratio between the input voltage $V_{in}$ and output voltage $V_{out}$ when the input voltage $V_{in}$ is in a first voltage range, and is provided independently from the input voltage $V_{in}$ when the input voltage $V_{in}$ is in a second, higher voltage range. When $V_{in}$ is in the second voltage range, the third rectifying element $D_3$ limits the current through the voltage limiting-element $D_{ref}$.

Operating in HRR mode (and neglecting the fourth resistive component $R_{ramp}$, and the offset across the first resistive component $R_{slew}$ for simplicity), the voltage $V_R$ will follow $V_{in}$ in a regulated ratio mode until it reaches a voltage $V_{ref}$, which is defined by the voltage-limiting element $D_{ref}$. If $V_{in}$ increases beyond this level, $V_R$ will not vary in regulated ratio mode but will instead remain at $V_{ref}$ until $V_{in}$ falls below this level again. This variation of $V_R$ may be expressed as follows $$V_R = \min\left(\frac{1}{1 + sC_t\frac{R_t R_{slew}}{R_t + R_{slew}}} nV_{in}, V_{ref}\right). \quad \text{Equation 18}$$

As noted above, a potential divider (part 100B) may be provided between parts 100A and 100C, and may, as in the present comprise a combination of two serially-connected resistive elements $R_1$ and $R_2$, the combination being connected in parallel across the first and second capacitive elements $C_S$ and $C_F$ of part 100A so as to convert the voltage $V_{sense}$ to a lowered voltage, $V_{in\text{-}div}$. In this embodiment, this lowered voltage is then provided to part 100C as the voltage which is indicative of a sensed voltage $V_{sense}$, and the voltage buffer 110 is arranged to buffer the lowered voltage $V_{in\text{-}div}$.

With this potential divider, the voltage $V_R$ is defined by the following formula:

$$V_R = \min\left(\frac{R_1}{R_1 + R_2} \cdot \frac{1}{1 + sC_t\frac{R_t R_{slew}}{R_t + R_{slew}}} nV_{in}, V_{ref}\right), \quad \text{Equation 19}$$

where s is a complex frequency, the regulated ratio input voltage part has the gain $G_{RR}$ of $$G_{RR} = n\frac{R_1}{R_1 + R_2}, \quad \text{Equation 20}$$

and the time constant $\tau_{RR}$ becomes $$\tau_{RR} = C_t \frac{R_t R_{slew}}{R_t + R_{slew}}. \quad \text{Equation 21}$$

This embodiment therefore differs from the known converter of FIG. 5 (which follows Equations 13 to 15) at least by the gain $G_{RR}$ and time constant $\tau_{RR}$ being independently configurable for a given capacitor $C_t$, and so the gain and time constant may be set to values required by a recipient circuit of voltage $V_R$, such as the controller 16 of an SMPS 11, and the SMPS may be properly controlled.

Figure 7:
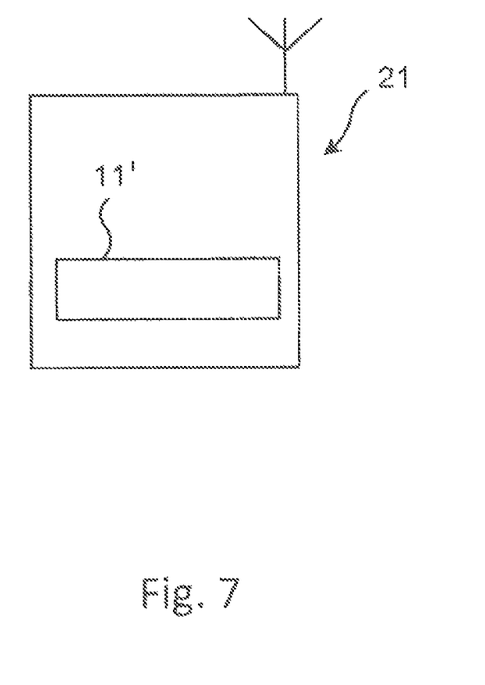
FIG. 7 is a schematic illustration of a base station comprising a switched mode power supply according to an embodiment of the present invention.

The isolated fly-buck converter according to an embodiment of the present invention, or an SMPS having the same (as described above), may find numerous applications, and may, in particular, serve as a power supply 11' for a base station 21 in a telecommunications network, as illustrated in FIG. 7.

[Modifications and Variations]

Many modifications and variations can be made to the embodiments described above.

For example, in the above embodiment, the third rectifying element $D_3$ is arranged between the voltage buffer 110 and a terminal where the voltage $V_R$ is measured. However, in other embodiments, the third rectifying diode $D_3$ may be arranged between the terminal where the voltage $V_R$ is measured and the first resistive element $R_{slew}$. In these alternative embodiments, when the third rectifying element $D_3$ is preventing current from flowing, the voltage $V_R$ does not depend upon the voltage across the third capacitive element $C_t$, and only depends on $V_{sense}$. Therefore, depending on where the third rectifying element $D_3$ is placed in the circuit, it may have the effect either of delaying a response of the voltage $V_R$ to an increase in the input voltage $V_{in}$, by isolating the voltage $V_R$ from $V_{sense}$, or of eliminating any delay in such circumstances, by isolating the voltage $V_R$ from the third capacitive element $C_t$.

Additionally, in the embodiment described above, the isolated fly-buck converter 100 comprises a voltage limiting-element $D_{ref}$. However, in other embodiments, voltage limiting element $D_{ref}$ may be omitted. Such embodiments may, for example, be used in order to operate an SMPS comprising the isolated fly-buck converter in a Regulated Ratio (RR) mode, in which the output voltage $V_{out}$ of the SMPS is provided with a regulated ratio between the input voltage $V_{in}$ and the output voltage $V_{out}$ for all values of input voltage $V_{in}$.

Furthermore, in the embodiment described above, the output of the voltage buffer 110 is taken to provide the voltage $V_R$ that is indicative of the input voltage $V_{in}$. However, in other embodiments, a voltage other than the buffered voltage, which is nevertheless based on the buffered voltage, may be output by the input voltage sensing circuit as the voltage $V_R$ that is indicative of the input voltage $V_{in}$.

The invention claimed is:

1. An isolated fly-buck converter for converting an input voltage to an output voltage, and generating a voltage indicative of the input voltage, comprising:
  a primary side circuit comprising a primary winding and a non-isolated buck connected in series, and switching elements arranged in the primary side circuit and configured to switch such that, during a forward phase of operation of the isolated fly-buck converter, the primary winding and the non-isolated buck are connected to the input voltage and, during a fly-buck phase of operation of the isolated fly-buck converter, the primary winding and the non-isolated buck are disconnected from the input voltage and are connected to one another in a closed circuit; and
  a secondary side circuit comprising a secondary winding coupled to the primary winding, a first capacitive element connected across the secondary winding, and a first rectifying element that is connected to the secondary winding so as to prevent current flowing through the secondary winding during the forward phase, wherein the output voltage is the voltage across the first capacitive element,
  wherein the secondary side circuit further comprises an input voltage sensing circuit for generating the voltage indicative of the input voltage, the input voltage sensing circuit comprising:
    a second capacitive element and a second rectifying element connected in series, the input voltage sensing circuit being connected across the secondary winding such that the second rectifying element prevents current from flowing through the input voltage sensing circuit during the fly-buck phase; and
    a voltage buffer arranged to buffer a voltage, which is indicative of a sum of the voltage over the second capacitive element and the output voltage, and output the buffered voltage or a voltage based on the buffered voltage as the voltage that is indicative of the input voltage, wherein an output of the voltage buffer is connected to ground via a first resistive element in series with a parallel combination of a second resistive element and a third capacitive element.

2. The isolated fly-buck converter of claim 1, wherein the input voltage sensing circuit further comprises a third rectifying element arranged to prevent current from flowing from the output of the voltage buffer to the first resistive element.

3. The isolated fly-buck converter of claim 1, wherein the voltage buffer comprises an operational amplifier provided with a feedback circuit that is arranged to feed back an output voltage of the operational amplifier to an inverting input of the operational amplifier, a non-inverting input of the operational amplifier being arranged to receive the voltage that is indicative of a sum of the output voltage and the voltage over the second capacitive element.

4. The isolated fly-buck converter of claim 3, wherein the feedback circuit comprises a third resistive element.

5. The isolated fly-buck converter of claim 1, wherein the second resistive element and the third capacitive element are connected to ground in parallel with the first capacitive element.

6. The isolated fly-buck converter of claim 5, wherein the input voltage sensing circuit further comprises a fourth resistive element connecting the first capacitive element to the first resistive element, the second resistive element and the third capacitive element.

7. The isolated fly-buck converter of claim 1, wherein the input voltage sensing circuit further comprises a voltage reference connected in parallel with the second resistive element and the third capacitive element.

8. The isolated fly-buck converter of claim 1, wherein the input voltage sensing circuit further comprises:
  a voltage divider comprising a combination of two serially-connected resistive elements that is connected in parallel across the first and second capacitive elements so as to convert the voltage that is the sum of the output voltage and the voltage over the second capacitive element into a lowered voltage, the voltage buffer being arranged to buffer the lowered voltage.

9. The isolated fly-buck converter of claim 1, wherein the input voltage sensing circuit further comprises a fifth resistive element connected in series with the second capacitive element and the second rectifying element.

10. The isolated fly-buck converter of claim 1, wherein the non-isolated buck comprises a fourth capacitive element.

11. A switched mode power supply comprising:
  a main converter configured to convert the input voltage to an output voltage of the switched mode power supply;
  a controller configured to control the main converter; and
  the isolated fly-buck converter according to claim 1.

12. The switched mode power supply of claim 11, wherein:
  the main converter is configured to convert the input voltage to the output voltage of the switched mode power supply by switching a switching element;
  the controller is configured to control a conversion performed by the main converter by controlling the switching of the switching element on a basis of a control signal; and
  the isolated fly-buck converter is configured to provide the controller with the voltage indicative of the input voltage as the control signal.

13. The switched mode power supply of claim 11, wherein the main converter is a DC-to-DC converter.

14. A base station comprising the switched mode power supply of claim 11.

15. A base station comprising the isolated fly-buck converter of claim 1.

* * * * *